May 13, 1958 R. EICHENBERG ET AL 2,834,097
WELDED CONNECTIONS AND VALVES AND METHOD OF MAKING SAME
Filed Nov. 24, 1952 2 Sheets-Sheet 1

Robert Eichenberg
J C Shuptrine
INVENTORS
BY
Murray Robinson
ATTORNEY

United States Patent Office 2,834,097
Patented May 13, 1958

2,834,097

WELDED CONNECTIONS AND VALVES AND METHOD OF MAKING SAME

Robert Eichenberg and J C Shuptrine, Houston, Tex., assignors to George A. Butler, Houston, Tex.

Application November 24, 1952, Serial No. 322,283

2 Claims. (Cl. 29—157.1)

This invention pertains to valves having separately made welded-on valve couplings and more particularly to such valves having separately made valve seats and plastic packing suitable for high pressure service. While the invention will be described as embodied in a gate valve, it is equally suitable for other types of valves such as plug valves.

An object of the invention is to provide method for making or assembling such a valve in which the welded connection between the coupling and valve body is so formed as to be free from stress concentrations.

A further object of the invention is to provide such methods by which the welded connection between the coupling and valve body can repeatedly be made perfectly 100% of the time even by hand welding whereby a reliable connection is assured.

Another object of the invention is to provide such methods of welding by which the welded connection is strong and tough as distinguished from weak and brittle.

Other objects and advantages of the invention will appear from the following description of a preferred embodiment thereof in which.

Figure 1:
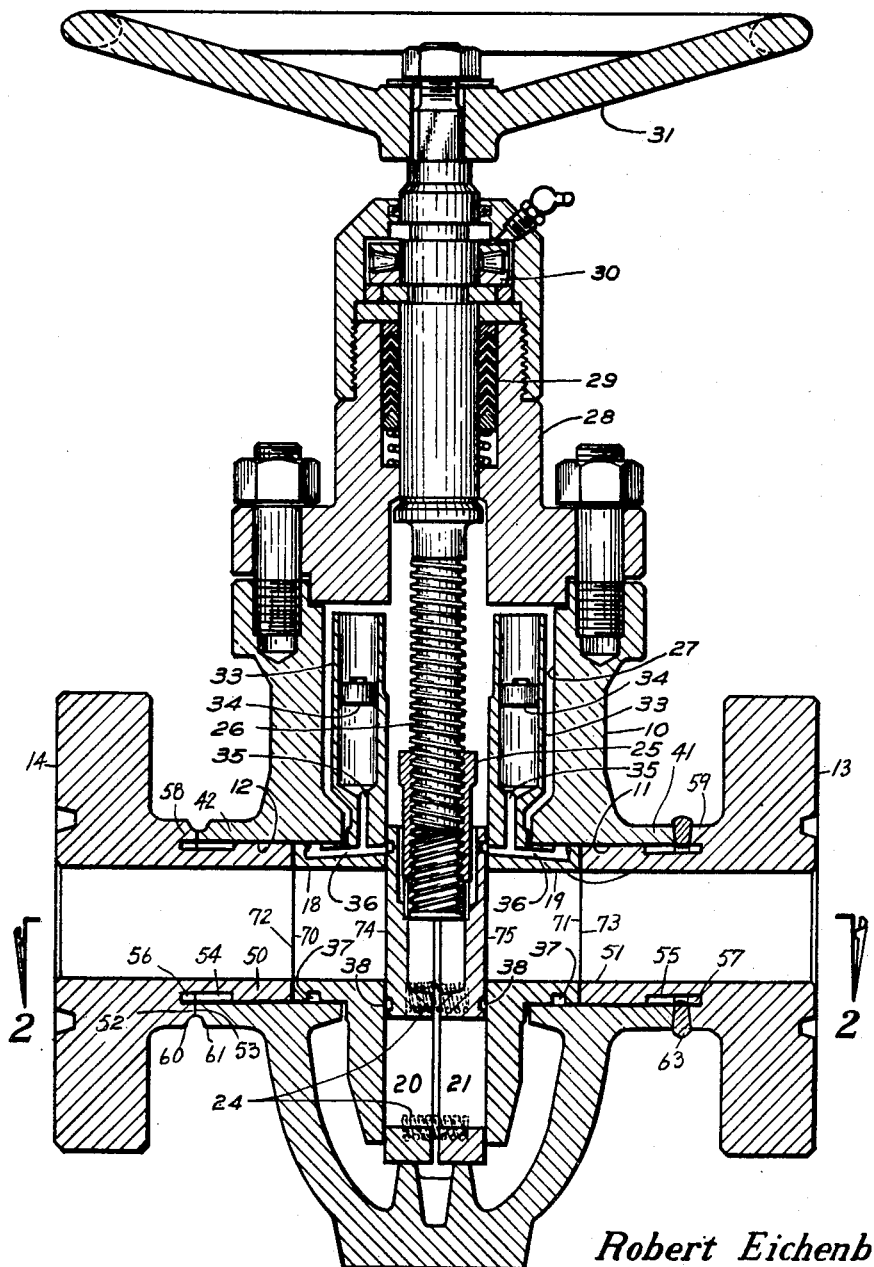
Figure 1 is a vertical axial section through the valve.

Referring to Figure 1, to illustrate the methods, there is shown a valve body 10 having inlet and outlet ports 11 and 12 therein to which are welded couplings 13 and 14. Inside the valve body are removably disposed seats 18 and 19.

Figure 2:
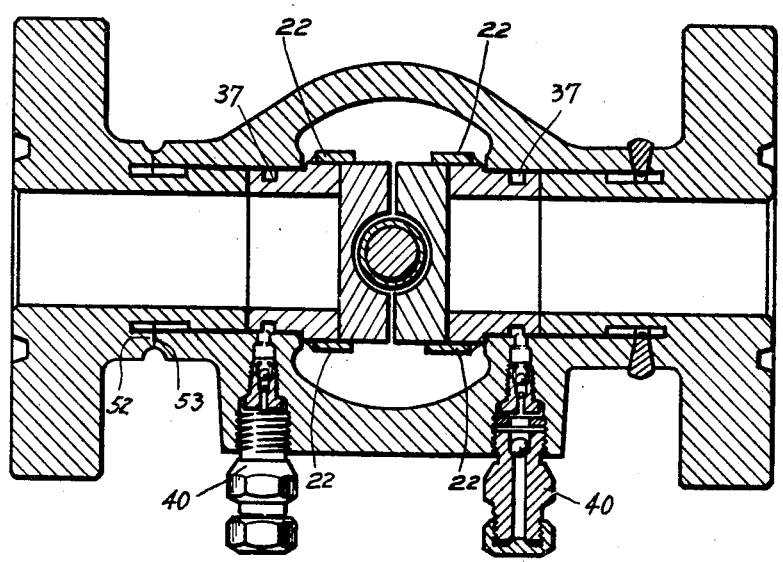
Figure 2 is a horizontal axial section through the valve.

As shown in Figure 2, the seats have guide strips 22 welded to their sides to guide the gates slidably disposed therebetween.

Referring again to Figure 1, each of the gates has a flow passage therethrough provided by openings 20 and 21. The gates are urged apart by springs 24. A nut 25 is connected at its lower end to the gates by means of a T head on the nut perpendicular to the flow axis engaging with horizontal slots on the inner faces of the gates. Stem 26 is threaded into the nut. The top of the stem passes out through opening 27 in the top of the valve body. A removable bonnet 28 is bolted over opening 27. Packing 29 in the bonnet seals between the stem and body and carries a bearing 30 to take the thrust of the valve stem when it is turned by hand wheel 31 to raise and lower the gates thereby opening and closing the valve.

At the top of the seats are carried cylinders 33 containing plastic sealing material. The ends of these cylinders are open so as to expose pistons 34, slidably disposed in the cylinders, to the pressure inside the valve body. The lower ends of the cylinders are connected by ports 35, 36 to annular grooves 37 in the valve seat necks and annular grooves 38 in the faces of the gates when the latter are in closed position. The plastic material provides a seal between the seats and body and between the gates and seats. Line fluid will usually leak past the upstream gate into the valve body which will then be at line pressure. This pressure exerted on the pistons 34 will produce enough pressure on the plastic to seal the downstream gate. As shown in Figure 2, additional plastic can be added to the sealing system through check valve fittings 40 which communicate with annular grooves 37.

When the valve is being constructed, the casting for the valve body is bored straight through to provide the inlet-outlet ports 11, 12. Since they are of one uniform diameter they can be bored in a single operation straight through from one side of the casting to the other, thus assuring concentricity. The valve body is thickened adjacent the ports 11, 12 so as to provide adequate support for the seats and couplings and to provide necks 41, 42 for welding as hereinafter described. The necks 50, 51 of the couplings 13, 14 have outer diameters slightly larger than the inner diameters of the ports 11, 12 so as to require a light pressure to enter therein. The coupling necks are pressed into ports 11, 12 as far as they will go. The positions of the couplings are determined by the abutting of the outer ends of the necks 41, 42 on the body against shoulders around the coupling necks. To illustrate this initial positioning of the couplings, coupling 14 at the left of Figures 1 and 2 is shown as it appears just after being press fitted to the valve body and prior to the subsequent welding step. The annular shoulder 52 on the coupling engages the annular face 53 at the outer end of the neck 42 on the valve body.

The neck of each of the couplings has an annular groove therearound as shown at 54, 55. Extensions of the grooves axially beyond the shoulders 52 into the body of each coupling as shown at 56, 57 leave the shoulders 52 as the end faces of collars 58, 59 spaced from the coupling necks by the grooves 56, 57. The grooves 54, 55 space the coupling necks 50, 51 from the body necks 42, 41 for a substantial axial distance from the end surfaces 53. The ends of both the coupling necks and body necks are chamfered or bevelled as shown at 60, 61 forming a channel between the necks having a U-shaped cross section and thereby reducing the thickness of the body necks and coupling collars adjacent the contacting surfaces 52, 53.

After the couplings are pressed into the body, the assembly is heated to about 600–900 degrees F. and the couplings are then welded to the valve body as shown at 63. The preheating of the assembly prior to welding prevents the weld from becoming too hard and brittle through formation of too much martensite due to too rapid cooling. The reduction of the area of contact of the weld with the unwelded metal during the welding operation by virtue of the spacing of the coupling neck from the weld further lowers the rate of cooling of the weld, particularly at the inner periphery thereof and helps reduce the amount of martensite formed. If the weld were not spaced from the coupling neck, the inner periphery thereof would be surrounded by metal on three sides which would cause it to cool more rapidly and this cooled weld metal at the inner periphery would in turn cause the rest of the weld to cool more rapidly.

Since the valve body is heated anyway to insure a strong tough weld as above described, the couplings could be shrink-fitted to the valve body by heating the valve body to a higher temperature. In any event, whether a shrink fit or press fit is used, the fit must be tight enough so that it will not come loose when the valve is preheated in preparation for the welding operation.

Because of the spacing of the body necks 42, 41 and the coupling collars 58, 59 from the coupling necks 50, 51 by the grooves 54, 55, 56, 57, it is readily possible to heat the metal on both sides of the weld to a high enough temperature to insure fusion. This would not be the case if the metal of the coupling neck contacted the body necks and coupling shoulders adjacent the weld, for the metal of the coupling neck would conduct away the heat from the welding area too rapidly. Furthermore, with the coupling neck spaced from the weld it is easy to tell if complete penetration through the surfaces 52, 53 is being achieved, for when these surfaces are heated sufficiently to fuse with each other and the weld metal they will sag under gravity and the pressure of the welding rod. On the other hand if the coupling necks were in contact with the weld they would support it and prevent it from sagging so there would be no indication to the welder whether or not he was achieving complete penetration.

Due to the press fit of the coupling necks in the valve ports, the couplings are firmly supported during the welding operations so that the couplings cannot become cocked at an angle to the axis of the ports. Furthermore, the couplings are held by the press fit against axial movement during the welding operation so that they remain accurately positioned as originally determined by the abutting of surfaces 52, 53.

After the welding of the couplings to the valve body, the assembly is reheated to a temperature of 600–1200 degrees F. and allowed to cool slowly, for example in still air at room temperature. This reheating relieves any internal stresses created during the welding operation. The 1200 degree upper temperature limit corresponds roughly to the lower critical temperature or eutectoid point for steel. The 600 degree lower temperature limit corresponds roughly to the minimum preheat temperature. Within this range, the higher the reheat temperature, the better the stress relief. However high temperature tends to cause scale formation. A compromise of these two factors is determined by the precise quality of the steel used and the nature of the medium in which it is cooled, i. e., oxidizing, inert, or reducing. When the assembly has cooled, the seats are placed in the valve body. The outer diameters of the necks of the seats are sufficiently larger than the inside diameters of the ports 11, 12 in the valve body to require a considerable pressure to press them into the ports. The seat necks are formed to make a tight press fit with the valve body because they are not otherwise held in place and also because they must seal therewith. If desired, the seats could be shrink fitted to the valve body, but to get as tight a fit as desired requires such a high temperature that it is apt to cause scaling. An expansion fit might also be used for the seats (or for the couplings also) or a combination of shrinking and expansion. Due to the cost of refrigeration, however, a press fit is preferred.

The temperatures, as herein stated, are for steel, and for other materials other temperatures may be necessary in carrying out the methods herein described.

The seat necks are pressed into ports 11 and 12 until their end faces 70, 71 abut against the end faces 72, 73 of the coupling necks. The spacing between the inner faces 74, 75 of the seats is thus determined by the axial distance between the inner faces 74, 75 and the respective end faces 70, 71 of the seats necks, by the axial distance between the end faces 72, 73 of the coupling necks from the shoulders 52 constituting the end faces of the coupling collars 58, 59, and the axial distance between the end faces 53 of the body necks. The latter are all exterior surfaces that are easily machined to close tolerances so that it is easy to accurately position the inner faces of the seats.

After the seats have been added to the assembly, the remainder of the valve including the gates and bonnet are assembled and the sealing system filled with plastic. When the valve is in use there will be outward axial pressure on both valve seats due to the line pressure inside the valve body caused by leakage past the upstream gate. This axial pressure will tend to blow off the couplings since it is transmitted thereto by the seat necks. The internal fillets adjacent the welds 63 formed by the grooves 54, 55, 56, 57 insure that there will be no stress concentration at the inner periphery of the weld. If the coupling necks were not spaced from the weld, there would have been a sharp bend at the welded juncture of the coupling and body with consequent stress concentration, and if, as might often be the case, the weld had not penetrated sufficiently to fuse the surfaces 52, 53, this sharp bend would be at the end of a radial crack where the loading would be such as to separate the opposite faces of the crack, thereby rendering the weld particularly susceptible to failure.

From the foregoing description it will be seen that the undercutting of the coupling necks performs the threefold functions of relieving stress, insuring complete penetration of the weld, and insuring slow cooling of the weld to form a tough, strong connection. All of these advantages can also be achieved by undercutting or counterboring the body necks and forming an annular groove between the coupling collar and neck that extends around the outside of the neck instead of into it. The spaces 54, 55, 56, 57 would then all lie just outside the outer diameter of the coupling neck instead of just inside of it.

While a preferred embodiment of the invention has been shown in the drawing and both the preferred embodiment and modifications thereof have been described, many other modifications thereof can be made by one skilled in the art without departing from the spirit of the invention and it is intended to protect by Letters Patent all forms of the invention falling within the scope of the following claims.

I claim:

1. With reference to a valve subassembly comprising a hollow steel valve body having inlet-outlet ports, a steel coupling having a neck adapted to be press fitted into one of said ports, and a seat having a neck adapted to be press fitted into said one of said ports, said body having an external neck around said one of said ports and said coupling having an external collar around its neck, said external neck and collar being spaced outwardly from said coupling neck when the coupling neck is fitted into said one of said ports, the method of assembling said valve subassembly comprising press fitting said coupling neck into said one of said ports from the exterior of said body until the end of said collar abuts against the end of said body neck, heating said body and coupling to about 600–900 degrees F., welding together the ends of said collar and body neck including the inner peripheries thereof adjacent the space between said external neck and collar and said coupling neck while said coupling and body are kept stationary relative to each other so as to leave after welding an annular air space between said coupling neck and the welded ends of said collar and body neck, reheating said body and coupling to about 600–1200 degrees F., cooling said body and coupling in still air at room temperature, and press-fitting said seat neck into said one of said ports from the interior of said body until the end of said seat neck abuts against the end of said coupling neck.

2. With reference to a subassembly comprising a hollow steel body having an inlet-outlet port, a steel coupling having a neck adapted to be press-fitted into said port, said body having an external neck around said port and said coupling having an external collar around its neck, said external neck and collar being spaced outwardly from said coupling neck when the coupling neck is fitted into said port, the method of assembling said subassembly comprising press fitting said coupling neck into said port from the exterior of said body until the end of said collar abuts against the end of said body neck, and welding together the ends of said collar and body neck including the inner peripheries thereof adjacent the space between said body neck and collar and said coupling neck while said coupling and body are kept stationary relative to each other so as to leave after welding an annular air space between said coupling neck and the welded ends of said collar and body neck.

(References on following page)

References Cited in the file of this patent

UNITED STATES PATENTS

| | | |
|---|---|---|
| 678,014 | Merrill | July 9, 1901 |
| 1,598,244 | Crook | Aug. 31, 1926 |
| 1,638,546 | Murray | Aug. 9, 1927 |
| 1,828,478 | Sparks | Oct. 20, 1931 |
| 2,107,575 | Matthews | Feb. 8, 1938 |
| 2,308,307 | Robinson | Jan. 12, 1943 |
| 2,433,638 | Volpin | Dec. 30, 1947 |
| 2,535,320 | Richardson | Dec. 26, 1950 |
| 2,632,624 | Giauque | Mar. 24, 1953 |
| 2,653,789 | Eichenberg | Sept. 29, 1953 |

FOREIGN PATENTS

| | | |
|---|---|---|
| 491,703 | Great Britain | Sept. 7, 1938 |